(12) United States Patent
Lundgren

(10) Patent No.: US 7,075,736 B1
(45) Date of Patent: Jul. 11, 2006

(54) COMPACT AND LIGHTWEIGHT DIGITAL CAMERA LENS

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/139,312

(22) Filed: May 27, 2005

(51) Int. Cl.
*G02B 9/36* (2006.01)
*G02B 9/60* (2006.01)

(52) U.S. Cl. ........................................ 359/775; 359/764
(58) Field of Classification Search ................ 359/708, 359/714, 715, 688, 764, 775
See application file for complete search history.

(56) References Cited

U.S. PATENT DOCUMENTS 3,022,708 A * 2/1962 Baker .......................... 359/708
6,297,913 B1 * 10/2001 Hasenauer et al. ......... 359/691

* cited by examiner

*Primary Examiner*—Alicia M Harrington
(74) *Attorney, Agent, or Firm*—MacPherson Kwok Chen & Heid LLP; David S. Park

(57) ABSTRACT

A compact, lightweight, and high-performance lens and method of using the same are provided. In one embodiment, the lens includes a crown glass having a first aspheric surface, a flint glass optically coupled to the crown glass, the first flint glass having a second aspheric surface, and an air gap between the crown glass and the flint glass.

18 Claims, 4 Drawing Sheets

COMPACT AND LIGHTWEIGHT DIGITAL CAMERA LENS

TECHNICAL FIELD

The present invention relates generally to optics and, more particularly, to a compact and lightweight lens and method of using the same.

BACKGROUND

Digital camera lenses are used for various applications, including but not limited to imaging sensors for small satellites, and consumer electronics such as small digital cameras for cellular telephones and PDAs.

Lenses are typically among the largest and heaviest components of small cameras and sensors, some weighing approximately 140 grams. However, shortening the length of a lens to reduce size or lowering the amount of glass to reduce mass typically have an adverse impact on the lens performance, for example reducing the ability to create images without blurring.

Thus, a compact and lightweight lens that also provides high-performance is highly desirable.

SUMMARY

The present invention provides a compact and lightweight but high-performance lens and method of using the same. In one embodiment, the lens includes five optics, two of which incorporate low order aspheric surfaces with a non-zero conic constant.

In accordance with an embodiment of the present invention, an optical lens is provided, the lens including a crown glass having a first aspheric surface; a first flint glass optically coupled to the crown glass, the first flint glass having a second aspheric surface; and an air gap between the crown glass and the flint glass.

In accordance with another embodiment of the present invention, another optical lens is provided, the lens including a crown glass having a first aspheric surface; a first flint glass optically coupled to the crown glass; an aperture stop adjacent the first flint glass; a second flint glass optically coupled to the aperture stop, the second flint glass having a second aspheric surface; a third flint glass coupled to the second flint glass; and an imaging lens optically coupled to the third flint glass.

In accordance with yet another embodiment of the present invention, a method of imaging is provided, the method including transmitting light from an image source through a crown glass having a first aspheric surface, then an air gap, and then a first flint glass optically coupled to the crown glass, the first flint glass having a second aspheric surface; controlling chromatic aberrations with the first and second aspheric surfaces and the air gap; and directing the light to an image focal plane.

Advantageously, the present invention provides a highly compact and lightweight lens that provides high performance, collecting more light than many available commercial lenses. The present invention provides excellent imagery for satellite digital cameras or other high-precision digital photography or video applications, such as factory machine vision, and for commercial applications such as for cellular telephones and PDAs.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
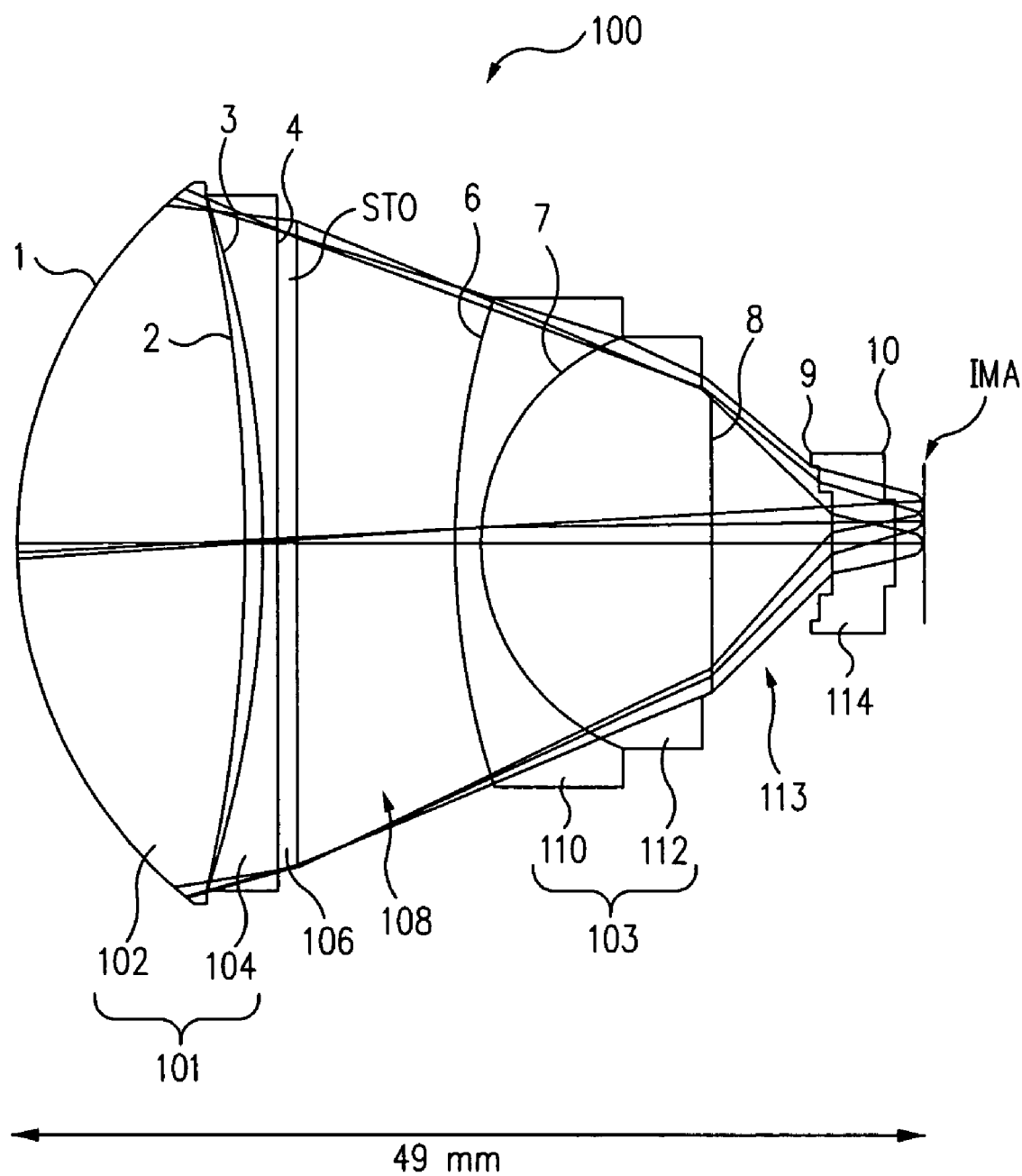
FIG. 1 shows a simplified side view of an optical lens in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

The present invention provides a compact, lightweight, and high-performance lens and method of using the same. In one embodiment, the lens of the present invention includes five optics, two of which incorporate conics. In one example, a 38 mm aperture lens having a length (including the relief to the focal plane) of about 49 mm and a mass (of the glass lens elements) of about 61 grams may be constructed that is fast (good light gathering), operating well at f/0.9 and being diffraction limited in the visible at f/8.

FIG. 1 shows a simplified side view of an optical lens 100 in accordance with an embodiment of the present invention. Lens 100 includes a first lens group 101 (e.g., an achromatic pair (doublet)) optically coupled to a second lens group 103 (e.g., an achromatic pair (doublet)) and separated by a space 108. A system aperture stop 106 is provided between first lens group 101 and second lens group 103. An imaging lens 114 is optically coupled to second lens group 103 and separated by a space 113, and an image of an object (not shown) is then provided at an imaging focal plane, shown by reference IMA.

In one example, first lens group 101 includes a crown glass 102 and a flint glass 104, and second lens group 103 includes a flint glass 110 and a flint glass 112. Aspheric conic surfaces are provided at the front surface of each of the first glasses of the lens groups 101 and 103 (e.g., a front surface 1 of crown glass 102 and a front surface 6 of flint glass 110) to function together with space 108 (e.g., an air gap) to maintain control over chromatic aberrations. In one example, a small air gap exists between crown glass 102 and flint glass 104 of first lens group 101, whereas flint glass 110 and flint glass 112 of second lens group 103 are "cemented" together.

System stop 106 may include a metal ring, in one example, or an iris (similar to those available in commercial cameras), therefore functioning to restrict light rays transmitted through the optical system and to define the amount of light flux transmitted by the optical system. In one example, the diameter of system stop 106 is about 38 mm.

In one example, imaging lens 114 provides a final field-flattening effect on the image and otherwise improves (e.g., clarifies, focuses, shortens the focal length, removes aberrations) the final image similar to the functions of a classic meniscus lens.

One aspect of making lens 100 fast and compact is spacing, which in one example is provided by spaces 108 and 113 (e.g., through a medium of air or other gas), to maintain a roughly constant ray angle through the lens, to the focal plane IMA, tapering in a roughly 45 degree cone. Aspheric surfaces 1 and 6 also allow for control over chromatic aberrations (color dispersion) and thus allows for reduction of glass (and hence reduction in mass) between lens groups 101 and 103. Lens 100 is also configured to include system stop 106 behind first lens group 101, which reduces the diameter, and therefore mass, of substantially all the system elements.

Although two pairs of lenses are provided in this embodiment as achromatic doublets, and other lenses are provided in a particular configuration, it is noted that one skilled in the art may pick other glasses (as discussed below in conjunction with FIGS. 4–6), and may add/subtract lenses to/from the system to further sharpen the image, particularly if a larger field of view is desired. In one example, the second lens group can include two different flint glasses, one flint glass, or a crown and a flint glass, as long as a second aspheric surface from a flint glass is provided. It should also be noted that while a typical achromatic lens is a crown lens and a flint lens, a flint—flint pair may be referred to as an achromatic doublet in this document since the form is similar.

Commonly available optical design software such as, for example, ZEMAX® from ZEMAX Development Corporation of San Diego, Calif., may be used to assist in describing the various characteristics (e.g., radius, thickness, glass type, diameter, and whether the surface is conic) corresponding to each surface region of each individual element/group within optical system 100. In the example configuration shown in FIG. 1, the ZEMAX software outputs surface data describing these surface characteristics as illustrated in Table 1.

TABLE 1

ZEMAX Software Output Describing Optical System 100

GENERAL LENS DATA:

| | |
|---|---|
| Surfaces | 11 |
| Stop | 5 |
| System Aperture | Entrance Pupil Diameter = 38 |
| Effective Focal Length | 33.37436 (in air at system temperature and pressure) |
| Total Track | 49.40845 |
| Image Space F/# | 0.8782726 |
| Stop Radius | 14.23872 |
| Paraxial Image Height | 4.242641 |
| Field Type | Paraxial Image height in Millimeters |
| Maximum Field | 4.242641 |
| Primary Wave | 0.5875618 |
| Lens Units | Millimeters |

Fields 5
Field Type Paraxial Image height in Millimeters

| # | X-Value | Y-Value | Weight |
|---|---|---|---|
| 1 | 0.000000 | 0.000000 | 3.000000 |
| 2 | 0.000000 | 2.000000 | 1.000000 |
| 3 | 2.000000 | 2.000000 | 1.000000 |
| 4 | 0.000000 | 3.000000 | 1.000000 |
| 5 | 3.000000 | 3.000000 | 1.000000 |

Wavelengths 3
Units μm

| # | Value | Weight |
|---|---|---|
| 1 | 0.486133 | 1.000000 |
| 2 | 0.587562 | 1.000000 |
| 3 | 0.656273 | 1.000000 |

SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | STANDARD | 22.81299 | 12.96409 | PSK3 | 39.15649 | −0.4562032 |
| 2 | STANDARD | −66.62921 | 0.4783454 | | 38.61559 | 0 |
| 3 | STANDARD | −58.04508 | 0.7271603 | SF1 | 37.84834 | 0 |
| 4 | STANDARD | 750.8621 | 1.210387 | | 35.54713 | 0 |
| STO | STANDARD | Infinity | 8.921799 | | 34.55775 | 0 |
| 6 | STANDARD | 40.10207 | 0.9818026 | SF1 | 26.80649 | −2.897021 |
| 7 | STANDARD | 12.00049 | 13.44143 | LAF2 | 22.70695 | 0 |
| 8 | STANDARD | −91.26881 | 6.413307 | | 19.66926 | 0 |
| 9 | STANDARD | −12.6565 | 3.257546 | LAF2 | 10.45281 | 0 |
| 10 | STANDARD | −32.03257 | 1.012579 | | 9.600586 | 0 |

TABLE 1-continued

ZEMAX Software Output Describing Optical System 100

| IMA | STANDARD | Infinity | | 9.438423 | 0 |
|---|---|---|---|---|---|

INDEX OF REFRACTION DATA:

System Temperature 20.00
System Pressure 1.00

| Surf | Glass | Temp | Pres | 0.486133 | 0.587562 | 0.656273 |
|---|---|---|---|---|---|---|
| 1 | PSK3 | 20.00 | 1.00 | 1.55835488 | 1.55232187 | 1.54965090 |
| 3 | SF1 | 20.00 | 1.00 | 1.73462020 | 1.71735985 | 1.71031348 |
| 6 | SF1 | 20.00 | 1.00 | 1.73462020 | 1.71735985 | 1.71031348 |
| 7 | LAF2 | 20.00 | 1.00 | 1.75568493 | 1.74400238 | 1.73904801 |
| 9 | LAF2 | 20.00 | 1.00 | 1.75568493 | 1.74400238 | 1.73904801 |

ELEMENT VOLUME DATA:

| Surface | Volume (cc) | Density (g/cc) | Mass (g) |
|---|---|---|---|
| Element surf 1 to 2 | 8.325991 | 2.910000 | 24.228633 |
| Element surf 3 to 4 | 2.717820 | 4.460000 | 12.121477 |
| Element surf 6 to 7 | 1.571076 | 4.460000 | 7.006997 |
| Element surf 7 to 8 | 3.945672 | 4.340000 | 17.124215 |
| Element surf 9 to 10 | 0.309327 | 4.340000 | 1.342480 |
| Total Mass: | | | 61.823802 |

The surface data for surface OBJ (object) correspond to an object to be imaged (not shown). The surface data for surfaces 1–2 and 3–4 correspond to crown glass 102 and flint glass 104, respectively, of first lens group 101. The surface data for surface STO (stop) correspond to system stop 106. The surface data for surfaces 6, 7, and 8 correspond to flint glass 110 and flint glass 112 of second lens group 103. The surface data for surfaces 9–10 and IMA correspond to imaging lens 114 and the imaging focal plane, respectively.

In one example, as described above, surface 1 of crown glass 102 and surface 6 of flint glass 110 are each provided with low order aspheric surfaces with a non-zero conic constant. In one example, surface 1 is an ellipsoid and surface 6 is a hyperboloid, both being positive surfaces.

An air gap exists between surfaces 2 and 3, STO and 6, 8 and 9, and 10 and IMA, as shown by the blank under the "Glass" column.

In one example, as shown by the thickness of the elements in the surface data summary and the mass of the elements in the element volume data, the present invention provides a lens system with a 38 mm aperture lens and a length (including the relief to the focal plane) of about 49 mm and a mass (of the glass lens elements) of about 61 grams, which is more compact and lightweight than conventional lenses.

The specific nomenclature representing the shapes, compositions, and definitions of the elements as presented in Table 1 follow standards as set forth in the ZEMAX manual. Lenses may be comprised of various applicable materials, including but not limited to glass, such as crown glass type PSK3 and flint glass type SF1 and LAF2, and optical plastic, such as Lexan® commercially available from the General Electric Company. Other surface data values for each individual element/group will become apparent to those of ordinary skill in the art in light of the present disclosure and may therefore be determined through routine experimentation dependent on the overall configuration and positioning of the individual elements/groups within optical system 100 and the quality of the image desired.

Figure 2:
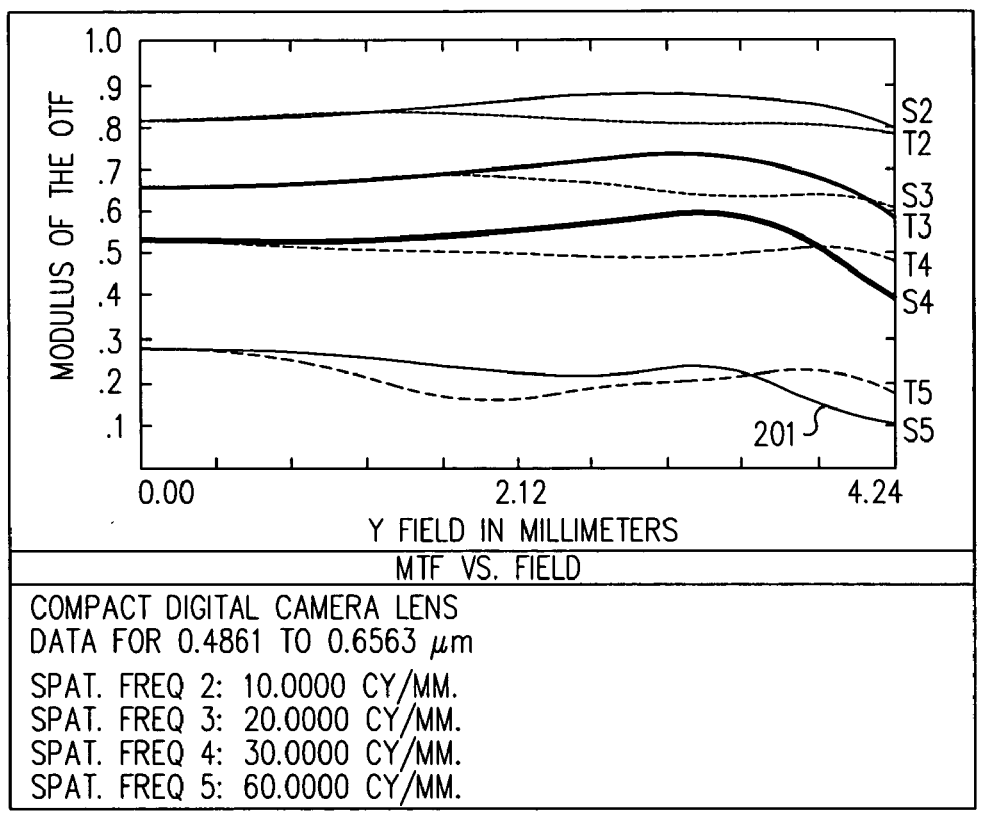
FIG. 2 shows a modulation transfer function (MTF) of the optical lens at f/0.9 in accordance with an embodiment of the present invention.
Figure 3:
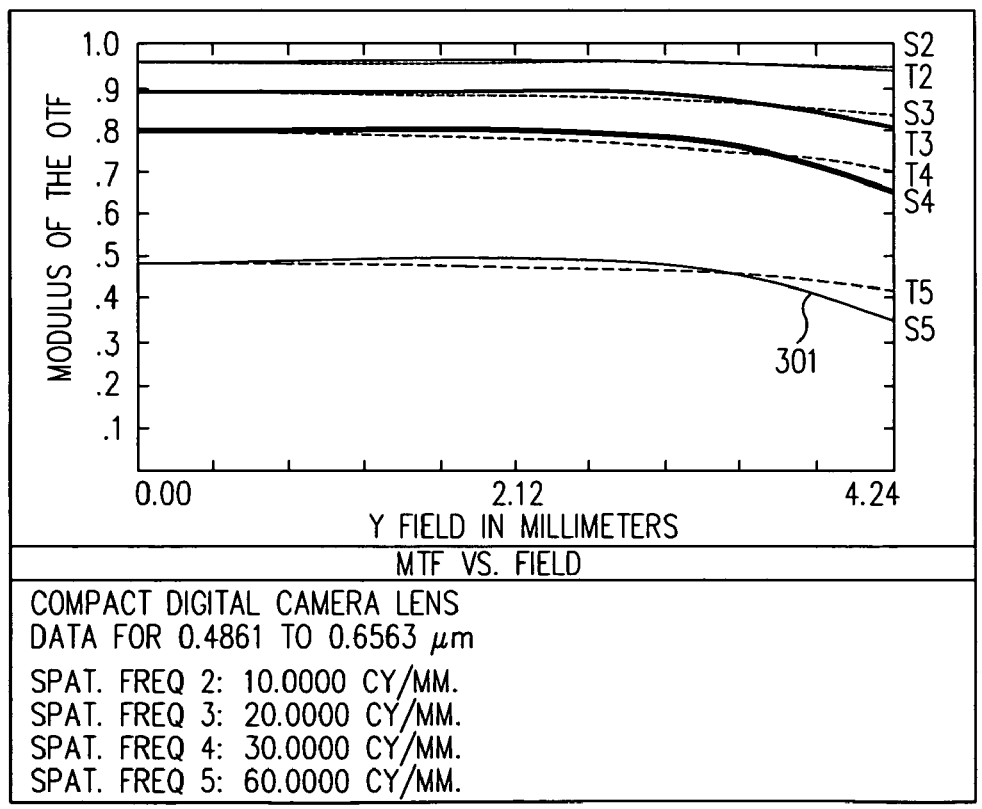
FIG. 3 shows a modulation transfer function (MTF) of the optical lens at f/2.4 in accordance with an embodiment of the present invention.

FIGS. 2 and 3 show a modulation transfer function (MTF) of an example of optical lens 100 of FIG. 1 at f/0.87 and f/2.4, respectively, in accordance with embodiments of the present invention. The MTF is a measure of the extent to which a lens, film, etc., can reproduce detail in an image. MTF is the spatial analog of frequency response in an electrical system.

The 2-dimensional Fourier transform of the point spread function is known as the optical transfer function (OTF). The value of this function along any radius is the Fourier transform of the line spread function in the same direction. The MTF is the absolute value of the Fourier transform of the line spread function.

Equivalently, the MTF of a lens is the ratio of the relative image contrast divided by relative object contrast of an object with sinusoidally varying brightness as a function of spatial frequency. The MTF for an ideal lens (ignoring the unavoidable effect of diffraction) is a constant 1 for spatial frequencies from 0 to infinity at every point and direction. For a practical lens it starts near 1 and falls off with increasing spatial frequency, with the MTF of a typical optical system being worse at the edges of the image and best at the center.

Lines 201 and 301 show the approximate sampling limits (cutoff) for a detector (e.g., of current satellite cameras) having typical 7 µm pixels. The x-axis of the graphs is image height, and each line is at a different spatial frequency, with the solid lines being across one dimension and the dashed lines being across another dimension. FIGS. 2 and 3 show the MTF at 10, 20, 30, and 60 line pair (lp)/mm for f/0.87 and f/2.4, respectively.

Advantageously, the present invention provides a compact and lightweight lens with superior performance characteristics. In one example, the present invention may be used with small and lightweight sensors for autonomous space vehicles (e.g., with electro-optical systems on a new class of very small nano-scale satellites) to assess other objects in space, with factory machine vision applications such as quality control, with commercial applications such as consumer cameras, cellular telephones, and PDAs, and with robotic applications.

Figure 4:
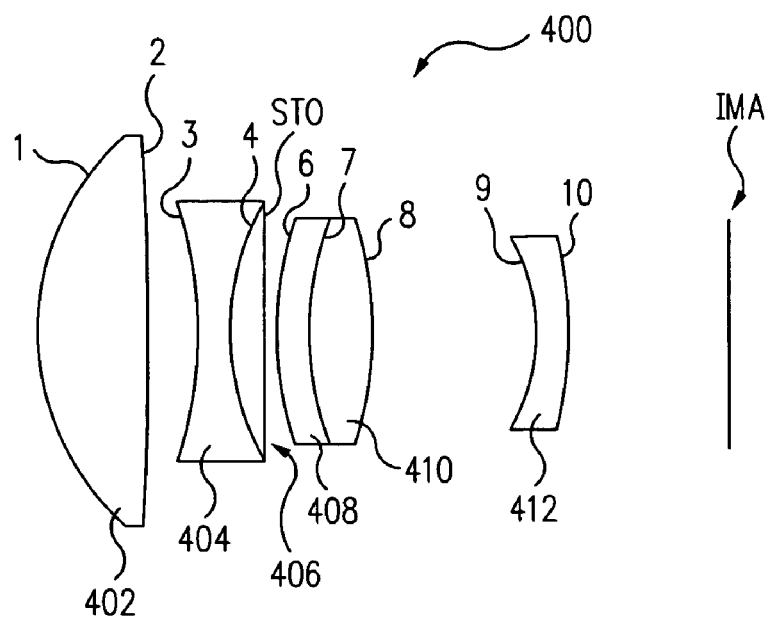
FIGS. 4, 5, and 6 show different embodiments of an optical lens in accordance with embodiments of the present invention.
Figure 5:
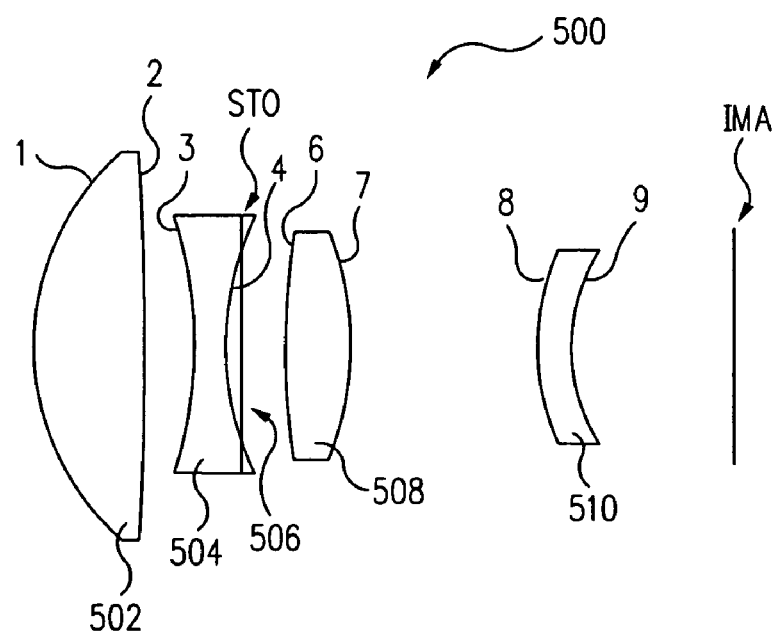
Figure 6:
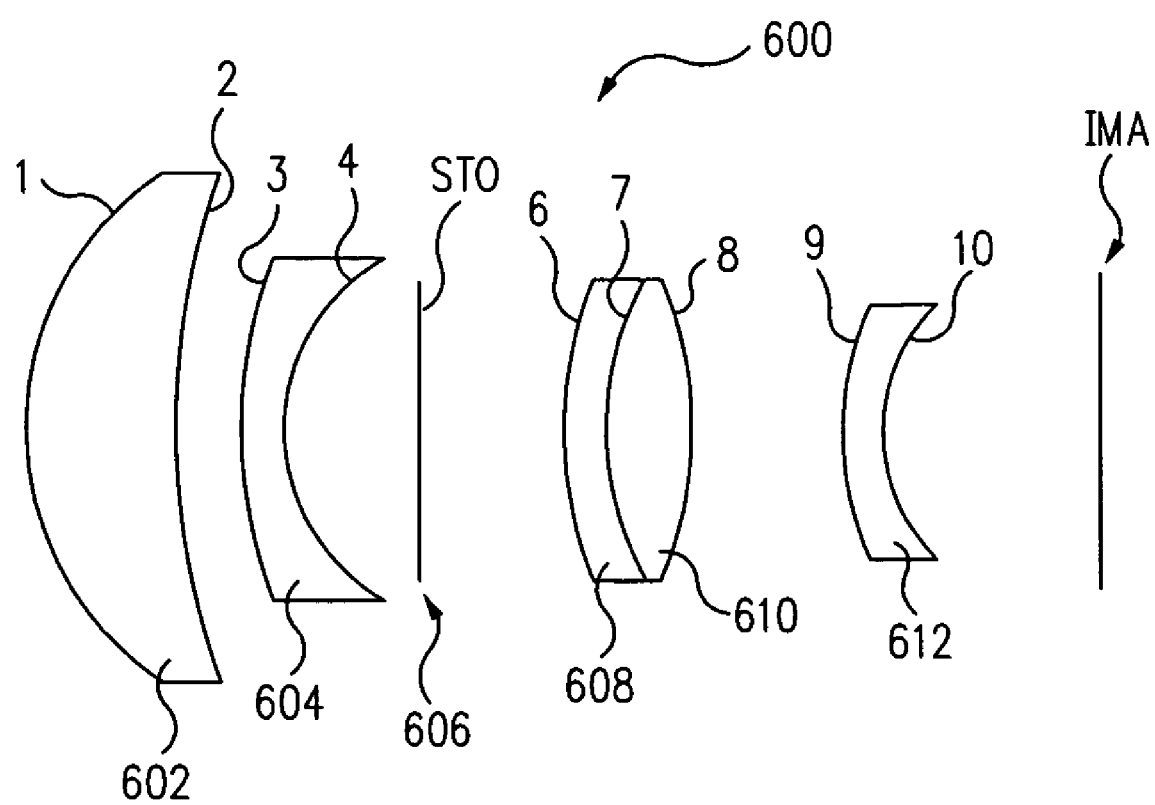

Referring now to FIGS. 4, 5, and 6, additional embodiments an optical lens are shown in accordance with the present invention.

FIG. 4 shows a lens 400 including a first lens group including a crown glass 402 and a flint glass 404. An aperture stop 406 is provided adjacent flint glass 404. A second lens group includes a flint glass 408 and a flint glass 410. An imaging lens 412 is optically coupled to the second lens group, and an image of an object (not shown) is then provided at an imaging focal plane, shown by reference IMA.

In the example configuration shown in FIG. 4, the ZEMAX software outputs surface data describing these surface characteristics as illustrated in Table 2.

TABLE 2

| ZEMAX Software Output Describing Optical System 400 | |
|---|---|
| GENERAL LENS DATA: | |
| Surfaces | 11 |
| Stop | 5 |
| System Aperture | Entrance Pupil Diameter = 18 |
| Glass Catalogs | SCHOTT |
| Ray Aiming | Off |
| Apodization | Uniform, factor = 0.00000E+000 |
| Temperature (C.) | 2.00000E+001 |
| Pressure (ATM) | 1.00000E+000 |
| Effective Focal Length | 36.01015 (in air at system temperature and pressure) |
| Effective Focal Length | 36.01015 (in image space) |
| Back Focal Length | 10.0778 |
| Total Track | 43.01304 |
| Image Space F/# | 2.000564 |
| Paraxial Working F/# | 2.000564 |
| Working F/# | 1.994172 |
| Image Space NA | 0.2424713 |
| Object Space NA | 9e-010 |
| Stop Radius | 6.524289 |
| Paraxial Image Height | 7.204498 |
| Paraxial Magnification | 0 |
| Entrance Pupil Diameter | 18 |
| Entrance Pupil Position | 16.83506 |
| Exit Pupil Diameter | 11.1336 |
| Exit Pupil Position | −22.19567 |
| Field Type | Angle in degrees |
| Maximum Field | 11.31371 |
| Primary Wave | 0.455 |
| Lens Units | Millimeters |
| Angular Magnification | 1.616728 |

| | Fields | 3 | |
|---|---|---|---|
| | Field Type | Angle in degrees | |
| # | X-Value | Y-Value | Weight |
| 1 | 0.000000 | 0.000000 | 1.000000 |
| 2 | 0.000000 | 8.000000 | 5.000000 |
| 3 | 8.000000 | 8.000000 | 10.000000 |

| | Wavelengths | 6 |
|---|---|---|
| | Units | μm |
| # | Value | Weight |
| 1 | 0.455000 | 20.000000 |
| 2 | 0.505000 | 20.000000 |
| 3 | 0.555000 | 20.000000 |
| 4 | 0.605000 | 20.000000 |
| 5 | 0.655000 | 12.000000 |
| 6 | 0.700000 | 7.000000 |

TABLE 2-continued

ZEMAX Software Output Describing Optical System 400

SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | STANDARD | 15.44311 | 7 | PSK3 | 24 | −0.2309592 |
| 2 | STANDARD | −160.3136 | 3 | | 24 | 0 |
| 3 | STANDARD | −26.32848 | 2 | SF1 | 16 | 0 |
| 4 | STANDARD | 16.28292 | 2.128283 | | 16 | 0 |
| STO | STANDARD | Infinity | 0.7595053 | | 15.85363 | 0 |
| 6 | STANDARD | 20.77184 | 2 | SF1 | 14 | −1.327658 |
| 7 | STANDARD | 19.19067 | 4 | LAF2 | 14 | 0 |
| 8 | STANDARD | −21.81758 | 10.12526 | | 14 | 0 |
| 9 | STANDARD | −12.2472 | 2 | LAF2 | 12 | 0 |
| 10 | STANDARD | −25.19672 | 10 | | 12 | 0 |
| IMA | STANDARD | Infinity | | | 14.40202 | 0 |

ELEMENT VOLUME DATA:

| | Volume (cc) | Density (g/cc) | Mass (g) |
|---|---|---|---|
| Element surf 1 to 2 | 1.910044 | 2.910000 | 5.558227 |
| Element surf 3 to 4 | 0.732597 | 4.460000 | 3.267381 |
| Element surf 6 to 7 | 0.318207 | 4.460000 | 1.419202 |
| Element surf 7 to 8 | 0.427218 | 4.340000 | 1.854125 |
| Element surf 9 to 10 | 0.272184 | 4.340000 | 1.181278 |
| Total Mass: | | | 13.280214 |

FIG. 5 shows a lens 500 including a first lens group including a crown glass 502 and a flint glass 504. An aperture stop 506 is provided adjacent flint glass 504. A second lens group includes a flint glass 508. An imaging lens 510 is optically coupled to the second lens group (i.e., flint glass 508), and an image of an object (not shown) is then provided at an imaging focal plane, shown by reference IMA.

FIG. 6 shows a lens 600 including a first lens group including a crown glass 602 and a flint glass 604. An aperture stop 606 is provided adjacent flint glass 604. A second lens group includes a flint glass 608 and a crown glass 610. An imaging lens 612 is optically coupled to the second lens group, and an image of an object (not shown) is then provided at an imaging focal plane, shown by reference IMA.

In the example configuration shown in FIG. 5, the ZEMAX software outputs surface data describing these surface characteristics as illustrated in Table 3.

In the example configuration shown in FIG. 6, the ZEMAX software outputs surface data describing these surface characteristics as illustrated in Table 4.

TABLE 3

ZEMAX Software Output Describing Optical System 500
SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | STANDARD | 15.32647 | 7 | PSK3 | 24 | −0.2071472 |
| 2 | STANDARD | −391.7632 | 3 | | 24 | 0 |
| 3 | STANDARD | −28.98024 | 2 | SF1 | 16 | 0 |
| 4 | STANDARD | 18.26125 | 0.9112846 | | 16 | 0 |
| STO | STANDARD | Infinity | 2.775979 | | 14.9505 | 0 |
| 6 | STANDARD | 40.1985 | 4 | LAF2 | 14 | −20.90341 |
| 7 | STANDARD | −19.54904 | 11.64467 | | 14 | 0 |
| 8 | STANDARD | 16.2611 | 2 | LAF2 | 12 | 0 |
| 9 | STANDARD | 10.76643 | 10 | | 12 | 0 |
| IMA | STANDARD | Infinity | | | 14.48255 | 0 |

TABLE 4

ZEMAX Software Output Describing Optical System 600
SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | STANDARD | 13.46652 | 7 | PSK3 | 24 | −0.3030542 |
| 2 | STANDARD | 35.18615 | 3 | | 24 | 0 |
| 3 | STANDARD | 21.67603 | 2 | SF1 | 16 | 0 |
| 4 | STANDARD | 9.140547 | 6.190861 | | 16 | 0 |
| STO | STANDARD | Infinity | 6.843253 | | 14.00481 | 0 |
| 6 | STANDARD | 17.72794 | 2 | SF1 | 14 | −1.695101 |
| 7 | STANDARD | 14.60109 | 3.971766 | BK7 | 14 | 0 |
| 8 | STANDARD | −17.8388 | 6.91552 | | 14 | 0 |
| 9 | STANDARD | 13.65838 | 2 | LAF2 | 12 | 0 |
| 10 | STANDARD | 8.195292 | 10 | | 12 | 0 |
| IMA | STANDARD | Infinity | | | 14.78756 | 0 |

The specific nomenclature representing the shapes, compositions, and definitions of the elements as presented in Tables 2, 3, and 4 follow standards as set forth in the ZEMAX manual. Lenses may be comprised of various applicable materials, including but not limited to glass, such as crown glass type PSK3 and flint glass type SF1 and LAF2, and optical plastic, such as Lexan® commercially available from the General Electric Company. Other surface data values for each individual element/group will become apparent to those of ordinary skill in the art in light of the present disclosure and may therefore be determined through routine experimentation dependent on the overall configuration and positioning of the individual elements/groups within optical systems 400, 500, and 600, and the quality of the image desired. Surfaces have been referenced with numerals 1 through 10, STO, and IMA.

Embodiments described above illustrate but do not limit the invention. It should also be understood that numerous modifications and variations are possible in accordance with the principles of the present invention. For example, more or less lenses as well as variation or adjustment in tilt or centering of lenses or other elements may occur according to desired image quality. Accordingly, the scope of the invention is defined only by the following claims.

I claim:

1. An optical lens, comprising:
   a crown lens having a first aspheric surface;
   a first flint lens optically coupled to the crown lens, the first flint lens having a second aspheric surface;
   an aperture stop between the crown lens and the first flint lens;
   an air gap between the crown lens and the first flint lens; and
   a second flint lens optically coupled to the crown lens to form an achromatic pair.

2. The lens of claim 1, further comprising a third flint lens coupled to a surface of the first flint lens to form an achromatic pair.

3. The lens of claim 2, further comprising an imaging lens optically coupled to the third flint lens.

4. The lens of claim 3, further comprising a second air gap between the third flint lens and the imaging lens.

5. The lens of claim 3, further comprising a second air gap between the imaging lens and an imaging focal plane.

6. The lens of claim 1, further comprising a second crown lens coupled to a surface of the first flint lens.

7. The lens of claim 1, wherein the lens has a mass less than 62 grams and a length less than 50 mm.

8. An optical lens, comprising:
   a crown lens having a first aspheric surface;
   a first flint lens optically coupled to the crown lens;
   an aperture stop adjacent the first flint lens;
   a second flint lens optically coupled to the aperture stop, the second flint lens having a second aspheric surface;
   a third flint lens coupled to the second flint lens; and
   an imaging lens optically coupled to the third flint lens.

9. The lens of claim 8, wherein the crown lens and the first flint lens form a first achromatic pair and wherein the second flint lens and the third flint lens form a second achromatic pair.

10. The lens of claim 8, wherein the aperture stop is between the crown lens and the first flint lens.

11. The lens of claim 8, wherein the aperture stop has a diameter of about 38 mm.

12. The lens of claim 8, wherein the third flint lens is cemented to a surface of the second flint lens.

13. The lens of claim 8, wherein the mass of the crown lens, the first flint lens, the second flint lens, the third flint lens, and the imaging lens is less than 62 grams.

14. The lens of claim 8, further comprising:
   a first air gap between the aperture stop and the second flint lens;
   a second air gap between the third flint lens and the imaging lens; and
   a third air gap between the imaging lens and an imaging focal plane.

15. The lens of claim 14, wherein a distance between the first aspheric surface and the imaging focal plane is less than 50 mm.

16. A method of imaging, comprising:
   transmitting light from an image source through a crown lens having a first aspheric surface, then a first flint lens optically coupled to the crown lens, then an aperture stop, then an air gap, and then a second flint lens optically coupled to the crown lens, the second flint lens having a second aspheric surface;
   controlling chromatic aberrations with the first and second aspheric surfaces and the air gap; and
   directing the light to an image focal plane.

17. The method of claim 16, further comprising transmitting the light from the image source through a third flint lens optically coupled to the second flint lens.

18. The method of claim 17, further comprising transmitting the light from the image source through an imaging lens optically coupled to the third flint lens.

* * * * *